United States Patent Office 3,037,787
Patented June 5, 1962

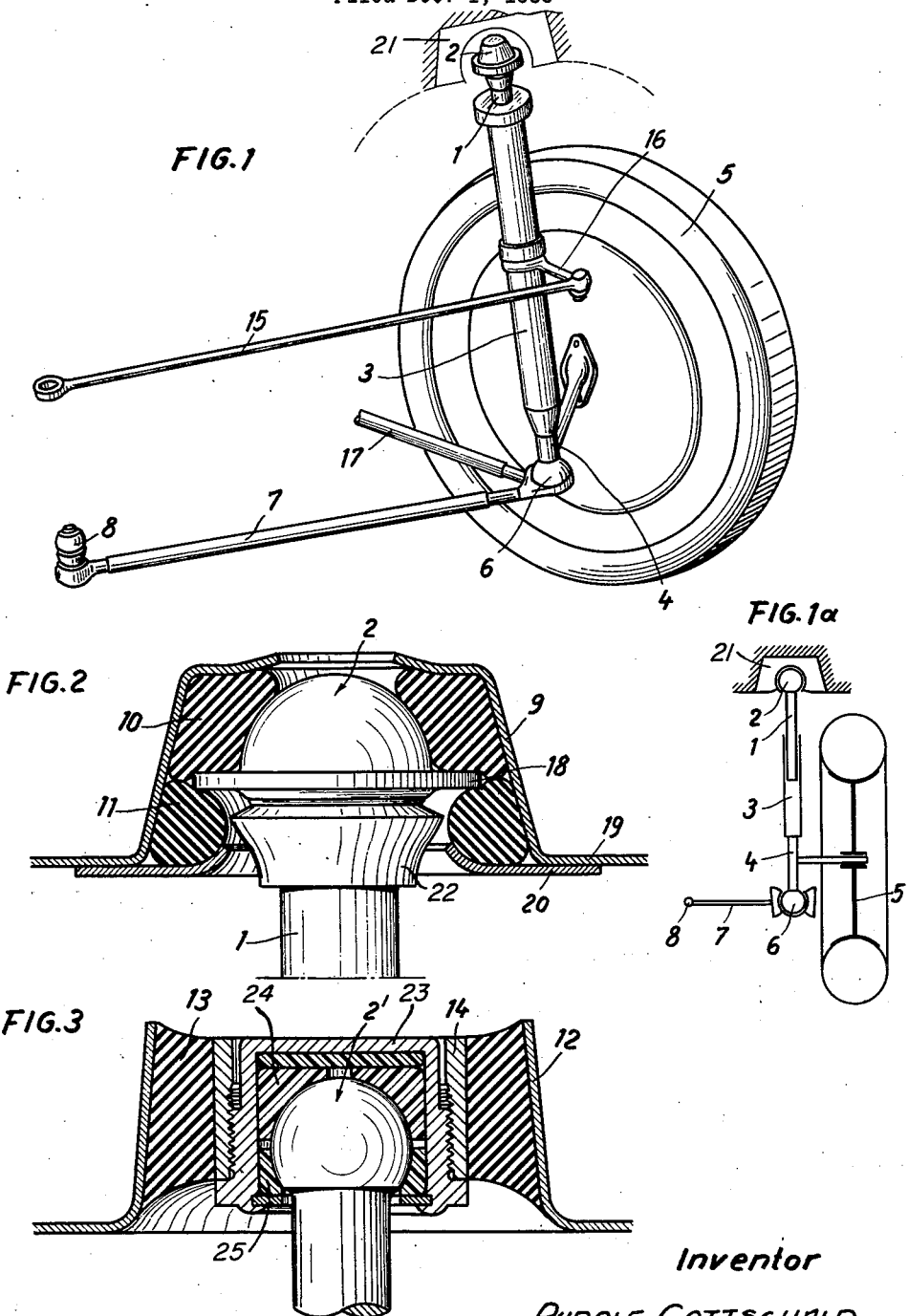

1

3,037,787
SUSPENSIONS FOR PIVOTALLY MOUNTED
VEHICLE WHEELS
Rudolf Gottschald, Osterrath, Meererbusch, Germany,
assignor to Fa. A. Ehrenreich & Cie.
Filed Dec. 1, 1959, Ser. No. 856,444
Claims priority, application Germany Dec. 3, 1958
5 Claims. (Cl. 280—96.2)

This invention relates to suspensions for pivotally mounted vehicle wheels and is especially applicable to motor vehicles, the stub-axle supports of which are fixed to the lower ends of telescopic spring and shock-absorber units and to transverse links as is the case in the Macpherson axle.

To improve the quietness of running of the vehicle, the upper end of the spring unit, which is connected to the vehicle, is usually supported by a rubber-metal bushing.

According to the present invention, the upper end of the telescopic spring unit in such a suspension is supported by a ball joint, the housing of which is elastically supported by means of rubber or rubber-like material.

In steering movements and movements of the spring, the ball joint enables the spring unit to move relatively to the chassis of the vehicle but, in contrast to a ball bearing, it is not so easily movable that it encourages a tendency of the front wheels to flutter. On the contrary, it tends to act as a damper of fluttering, and in this connection it is an advantage that the degree of movement of the ball joint should be adjustable as desired. Slight shocks by the road are absorbed by the elastic support before the telescopic spring responds.

An example of a suspension in accordance with the invention is illustrated in the accompanying drawing, in which:

FIGURE 1 is a diagrammatic perspective view;

FIGURE 1a is a diagrammatic front elevation of the suspension;

FIGURE 2 is a vertical section through the ball joint, and

FIGURE 3 is a vertical section through a modified ball joint.

As shown in FIGURES 1 and 1a, the upper end 1 of a telescopic spring and shock-absorber unit is supported on the chassis 21 of the vehicle. A stub-axle support 4 for a wheel 5 is fixed on the lower end 3 of the spring and shock-absorber unit. The support is also connected by a ball joint 6 to a transverse link 7 which is pivotally attached by a joint 8 to a part of the chassis 21 of the vehicle. The wheel is moved to steer the vehicle by a track rod 15 operating through a drag arm 16. The reference numeral 17 indicates a stabiliser of which only a part is shown.

The ball pin of the ball joint 2 is screwed into the upper end 1 of the spring and shock-absorber unit. This ball joint has a yielding attachment to the vehicle.

As shown in FIGURE 2, the housing 22 of the joint 2 is yieldingly carried in a sheet metal casing 9 which is fixed to the chassis 21 of the vehicle. For this purpose, the housing 22 of the joint is provided with a peripheral flange 18 which is directed transversely to the part 1. The flange 18 is sandwiched between two compressed rubber rings 10 and 11 fixed in the casing 9. The rubber

2 ring 10 lies against the upper end of the casing 9. A ring 20 which is fixed to a flange 19 on the casing 9 by rivets or welding, holds the housing 22 and the two rubber rings 10, 11 in the sheet metal casing 9. The sheet metal casing 9 is bolted or riveted to the vehicle. The rubber rings 10 and 11 enable movement of the housing 22 to take place when shocks occur.

In the example illustrated in FIGURE 3, the ball joint 2′, shown in vertical section, is supported in a rubber mounting. The mounting includes a sheet metal box 12 having a rubber sleeve 13 bonded to it. The sleeve 13 is also bonded to an internal metal box 14. The housing 23 of the ball joint 2′ is screwed into the box 14. The ball joint 2′ is mounted within the housing 23 by plastic bearing members 24 and 25.

Although the ball joints described are mainly intended for use with telescopic spring units of Macpherson axles, they can be used wherever an elastic joint support is required. For example, it may be advantageous for the joint 6 to be similar to the joint shown in FIGURE 2 or 3.

I claim:

1. In a suspension for a pivotally mounted vehicle wheel, a telescopic spring unit, a stub-axle support fixed to the lower end of said spring unit, said spring unit being supported at its lower end by a transverse link and at its upper end by a ball joint, said ball joint having housing means resiliently mounted for limited universal movement in a casing fixed to the vehicle chassis, said housing means being bonded to the inside of a ring of resilient material, the outside of said ring being bonded to said casing, and said housing means comprises a first member bonded to said ring and a second member screwably inserted into said first member.

2. In a suspension for pivotally mounting a vehicle wheel to a vehicle chassis, a telescopic spring unit, a stub-axle support fixed at one end to the lower end of said spring unit and at its other end to said vehicle wheel, said spring unit being supported at its lower end by a ball joint which is connected to a transverse link and at its upper end by a resiliently mounted ball joint which is connected to said vehicle chassis, said resiliently mounted ball joint having a ball housing which is connected to the ball of said joint and bearing against at least one compressed ring of resilient material, and said ring of resilient material being mounted within and fixed in a casing which is fixed to said vehicle chassis so that said housing may universally move within said casing.

3. In a suspension for pivotally mounting a vehicle wheel to a vehicle chassis, a telescopic spring unit, a stub-axle support fixed at one end to the lower end of said spring unit and at its other end to said vehicle wheel, said spring unit being supported at its lower end by a ball joint which is connected to a transverse link and at its upper end by a resiliently mounted ball joint which is connected to said vehicle chassis, said resiliently mounted ball joint having a ball housing which is connected to the ball of said joint and bearing against two compressed rings of resilient material, said rings of resilient material being mounted within and fixed in a casing which is fixed to said vehicle chassis so that said housing may universally move within said casing, said housing having a peripheral flange which has a diameter larger than the diameter of said ball of said resiliently mounted ball joint but less than the inside diameter of said casing, and said flange being held between said compressed rings of resilient material contained within said casing.

4. In a suspension for pivotally mounting a vehicle wheel to a vehicle chassis, a telescopic spring unit, a stub-axle support fixed at one end to the lower end of said spring unit and at its other end to said vehicle wheel, said spring unit being supported at its lower end by a ball joint which is connected to a transverse link and at its upper end by a resiliently mounted ball joint which is connected to said vehicle chassis, said resiliently mounted ball joint having a ball housing which is connected to the ball of said joint and bearing against at least one compressed ring of resilient material, said ring of resilient material being mounted within and fixed in a casing which is fixed to said vehicle chassis so that said housing may universally move within said casing, said housing having an outer member bonded to the inside surface of said ring of resilient material and an inner member connected to said ball of said joint and releasably connected to said outer member, and the outside surface of said ring of material being bonded to said casing.

5. In a suspension in accordance with claim 4 wherein said inner member of said housing threadably engages said outer member of said housing.

References Cited in the file of this patent

UNITED STATES PATENTS

| 1,002,229 | Curtis | Sept. 5, 1911 |
| 2,018,653 | Best | Oct. 29, 1935 |
| 2,273,869 | Julien | Feb. 24, 1942 |
| 2,490,972 | Lear | Dec. 13, 1949 |
| 2,660,449 | MacPherson | Nov. 24, 1953 |
| 2,856,198 | Muller | Oct. 14, 1958 |

FOREIGN PATENTS

| 553,934 | Italy | Jan. 4, 1957 |

(Corresponding Swiss 339,816, Sept. 15, 1959)